(12) United States Patent
Gandhi et al.

(10) Patent No.: US 12,517,903 B2
(45) Date of Patent: Jan. 6, 2026

(54) PREDICTING DATA AVAILABILITY AND SCHEDULING DATA PULLS

(71) Applicant: Plaid Inc., San Francisco, CA (US)

(72) Inventors: Vivek Manoj Gandhi, New York, NY (US); Jeremy Mason-Herr, Santa Cruz, CA (US); Maksim Rozen, New York, NY (US)

(73) Assignee: Plaid Inc., San Francisco, CA (US)

( * ) Notice: Subject to any disclaimer, the term of this patent is extended or adjusted under 35 U.S.C. 154(b) by 148 days.

(21) Appl. No.: 18/178,983

(22) Filed: Mar. 6, 2023

(65) Prior Publication Data

US 2024/0303237 A1 Sep. 12, 2024

(51) Int. Cl.
*G06N 5/022* (2023.01)
*G06F 16/2453* (2019.01)
*G06F 16/2455* (2019.01)

(52) U.S. Cl.
CPC .... *G06F 16/24542* (2019.01); *G06F 16/2455* (2019.01); *G06N 5/022* (2013.01)

(58) Field of Classification Search
CPC .......... G06F 16/24542; G06F 16/2455; G06N 5/022
USPC .......................................................... 706/12
See application file for complete search history.

(56) References Cited

U.S. PATENT DOCUMENTS

| | | | |
|---|---|---|---|
| 9,424,098 B2 * | 8/2016 | Goh | G06F 9/5083 |
| 9,832,129 B1 * | 11/2017 | Jambunathan | H04M 15/8228 |
| 10,311,405 B2 * | 6/2019 | Burton | G06Q 10/103 |
| 10,926,183 B2 * | 2/2021 | Covington | G06N 7/01 |
| 11,341,434 B2 * | 5/2022 | DeHart | G06N 20/00 |
| 11,625,796 B1 * | 4/2023 | Xia | G06Q 30/0202 |
| | | | 705/14.46 |
| 11,651,007 B2 * | 5/2023 | Shang | H04L 65/612 |
| | | | 707/705 |
| 11,797,876 B1 * | 10/2023 | Wang | G06N 3/0464 |
| 11,824,794 B1 * | 11/2023 | Childress | H04L 47/822 |
| 12,068,066 B2 * | 8/2024 | Neumann | G16H 10/60 |
| 2005/0081200 A1 * | 4/2005 | Rutten | G06F 9/4881 |
| | | | 718/100 |
| 2006/0111953 A1 * | 5/2006 | Setya | G06Q 10/10 |
| | | | 705/7.26 |
| 2012/0057191 A1 * | 3/2012 | Gnanasambandam | |
| | | | G06F 3/1211 |
| | | | 358/1.15 |
| 2012/0324041 A1 * | 12/2012 | Gerber | H04W 8/20 |
| | | | 709/217 |

(Continued)

*Primary Examiner* — Hanh B Thai
(74) *Attorney, Agent, or Firm* — Harrity & Harrity, LLP

(57) ABSTRACT

In some implementations, a data aggregator may receive an indication associated with a data record. The data aggregator may apply a model to the indication to generate a prediction regarding when new information associated with the data record will be available. Based on the prediction, the data aggregator may refrain from requesting new information and may schedule a pull for new information associated with the data record for a later time. Additionally, or alternatively, the data aggregator may receive an indication associated with a plurality of data pulls that are associated with a plurality of data records and may receive an indication of a rate limit associated with a host for the plurality of data records. The data aggregator may apply rules to generate a ranking of the plurality of data pulls and may schedule the plurality of data pulls based on the ranking and the rate limit.

20 Claims, 12 Drawing Sheets

(56) References Cited

U.S. PATENT DOCUMENTS

| | | | |
|---|---|---|---|
| 2014/0068627 A1* | 3/2014 | Goh | G06F 9/5094 |
| | | | 718/105 |
| 2016/0088006 A1* | 3/2016 | Gupta | H04L 41/16 |
| | | | 706/12 |
| 2016/0310850 A1* | 10/2016 | Covington | G06Q 50/34 |
| 2016/0350671 A1* | 12/2016 | Morris, II | G05B 23/0229 |
| 2016/0364695 A1* | 12/2016 | Patterson | G06Q 10/1093 |
| 2017/0147951 A1* | 5/2017 | Meyer | G06Q 50/14 |
| 2017/0220403 A1* | 8/2017 | Maag | G06F 11/3692 |
| 2019/0026697 A1* | 1/2019 | Burton | G06F 8/71 |
| 2019/0361910 A1* | 11/2019 | Rogynskyy | H04L 51/046 |
| 2019/0361935 A1* | 11/2019 | Muniz Navarro | G06F 40/30 |
| 2020/0027042 A1* | 1/2020 | DeHart | G06N 20/00 |
| 2020/0290740 A1* | 9/2020 | Rangan | G06V 20/597 |
| 2021/0012478 A1* | 1/2021 | More | G06F 18/214 |
| 2021/0073021 A1* | 3/2021 | Faulhaber, Jr. | G06F 9/455 |
| 2022/0029892 A1* | 1/2022 | Hooli | H04L 41/0823 |
| 2022/0114601 A1* | 4/2022 | Littlejohn | G06Q 30/0272 |
| 2022/0188705 A1* | 6/2022 | Davoodi | G06F 11/0766 |
| 2022/0247694 A1* | 8/2022 | Jackson | H04L 47/83 |
| 2022/0277831 A1* | 9/2022 | Neumann | G16H 20/60 |
| 2022/0284361 A1* | 9/2022 | Notani | G06Q 10/087 |
| 2022/0293254 A1* | 9/2022 | Reynolds | G06F 3/0482 |
| 2023/0023181 A1* | 1/2023 | Shang | G06F 16/248 |
| 2023/0115235 A1* | 4/2023 | Shono | G01W 1/10 |
| | | | 700/291 |
| 2023/0181121 A1* | 6/2023 | Varadan | G16H 50/30 |
| | | | 600/301 |
| 2023/0236946 A1* | 7/2023 | Li | G06F 11/3442 |
| | | | 718/104 |
| 2023/0289682 A1* | 9/2023 | Chinnamgari | G06Q 50/40 |
| 2023/0300654 A1* | 9/2023 | Da Silva | H04W 36/0085 |
| | | | 370/242 |
| 2023/0325759 A1* | 10/2023 | Lee | G06Q 10/0833 |
| 2023/0351530 A1* | 11/2023 | Clayton | G06Q 50/08 |
| 2023/0379267 A1* | 11/2023 | Childress | H04L 47/781 |
| 2024/0031075 A1* | 1/2024 | Yao | H04L 1/1854 |
| 2024/0098155 A1* | 3/2024 | Sze | H04L 45/24 |
| 2024/0112119 A1* | 4/2024 | Parameshwar | G06F 9/543 |
| 2024/0137884 A1* | 4/2024 | Bai | G06N 20/00 |

\* cited by examiner

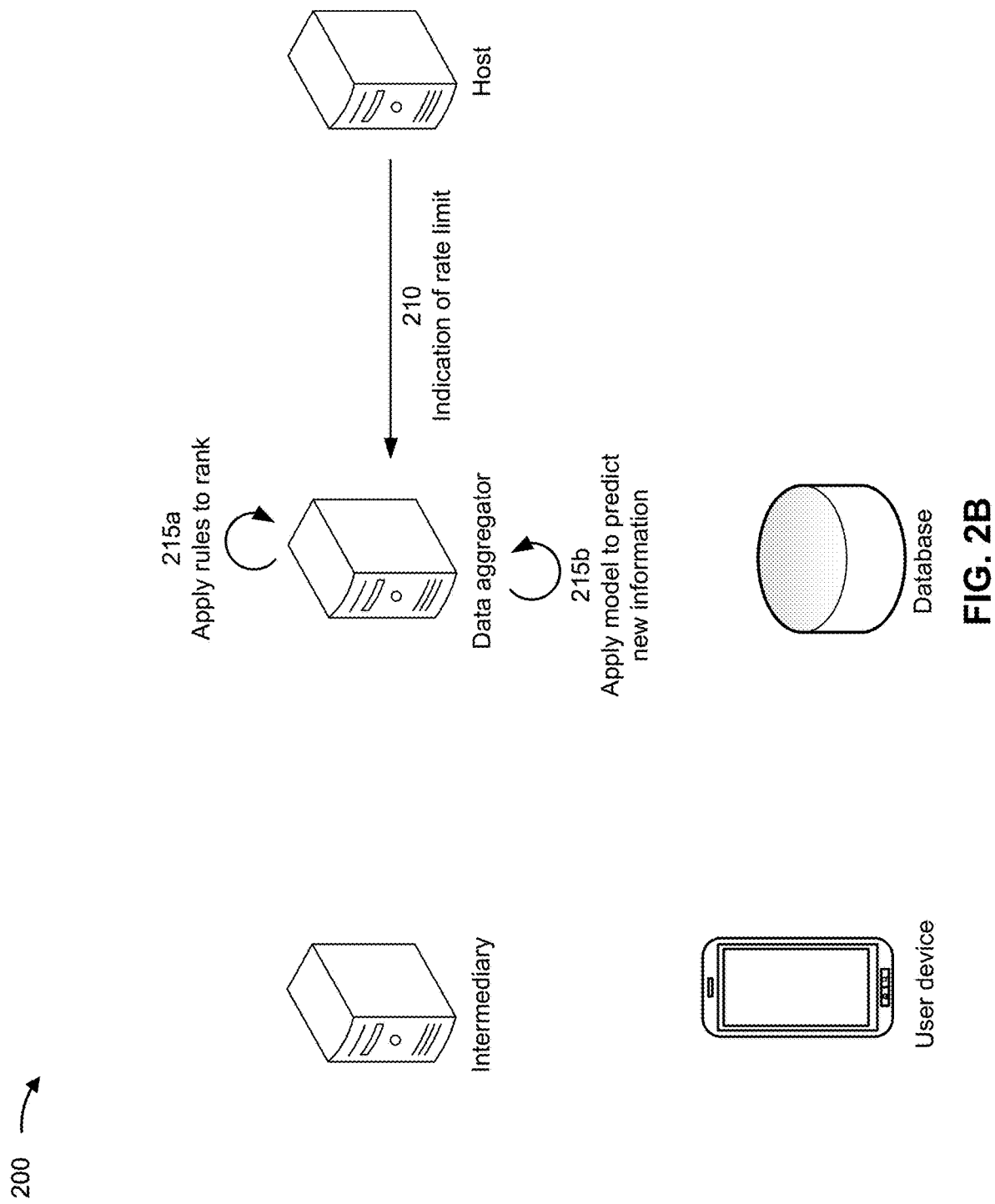

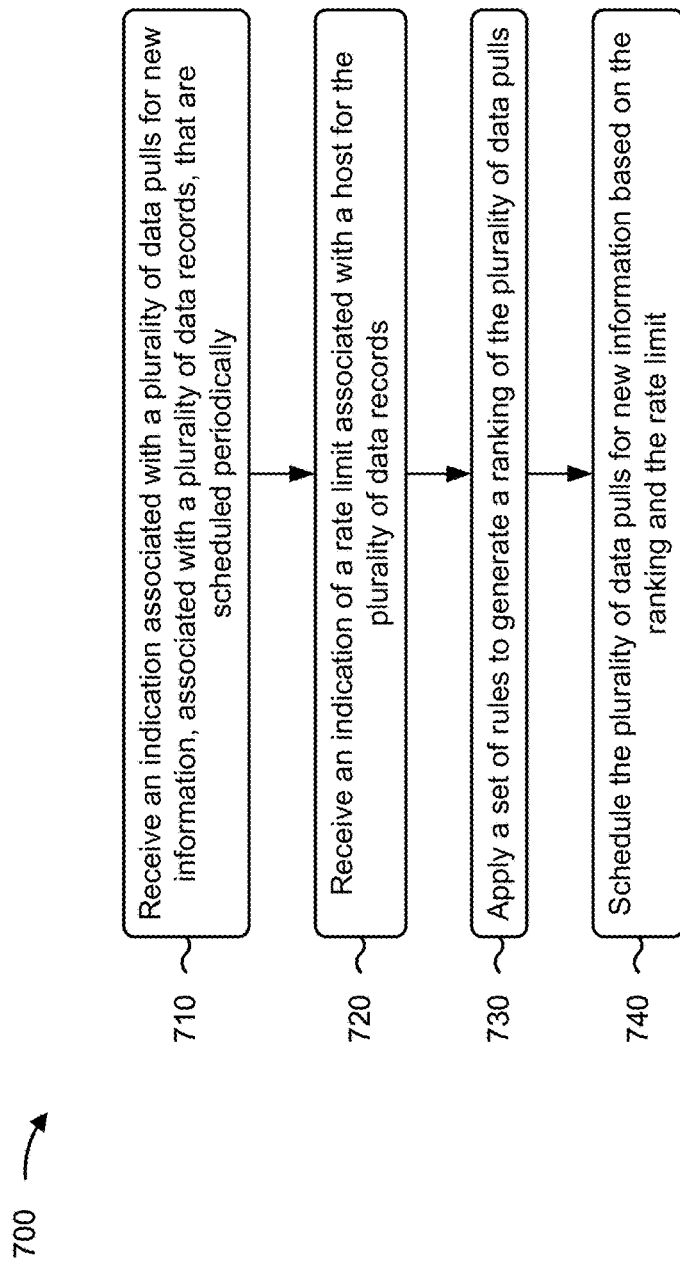

PREDICTING DATA AVAILABILITY AND SCHEDULING DATA PULLS

BACKGROUND

Data aggregation is used in many different situations. For example, a data aggregator may access data records across multiple data hosts and collate the data records together. In another example, a data aggregator may access multiple data records across a single data host and collate the data records together. Accordingly, the data aggregator helps conserve network resources that would otherwise be consumed when multiple devices access the data records individually.

SUMMARY

Some implementations described herein relate to a system for predicting data availability. The system may include one or more memories and one or more processors communicatively coupled to the one or more memories. The one or more processors may be configured to receive an indication associated with a data record, wherein a pull for new information associated with the data record is scheduled for a first time. The one or more processors may be configured to determine, based on a type of the data record, whether to apply a first model, trained on information regarding previous pulls associated with a host for the data record, that outputs an expected amount of time to wait, or a second model, trained on the information regarding previous pulls, that outputs an expected datetime. The one or more processors may be configured to apply the first model or the second model to the indication to generate a prediction regarding when new information associated with the data record will be available at the host. The one or more processors may be configured to reschedule the pull for new information associated with the data record to a second time based on the prediction.

Some implementations described herein relate to a method of predicting data availability. The method may include receiving an indication associated with a data record. The method may include applying a model, trained on information regarding previous pulls associated with a host for the data record, to the indication to generate a prediction regarding when new information associated with the data record will be available at the host. The method may include refraining from requesting new information associated with the data record from the host based on the prediction. The method may include scheduling a pull for new information associated with the data record for a later time based on the prediction.

Some implementations described herein relate to a non-transitory computer-readable medium that stores a set of instructions for predicting data availability for a device. The set of instructions, when executed by one or more processors of the device, may cause the device to receive an indication associated with a data record, wherein a pull for new information associated with the data record is scheduled according to a periodicity. The set of instructions, when executed by one or more processors of the device, may cause the device to apply a model, trained on information regarding previous pulls associated with a host for the data record, to the indication to generate a prediction regarding whether new information associated with the data record will be available at the host. The set of instructions, when executed by one or more processors of the device, may cause the device to refrain from requesting new information associated with the data record from the host during an upcoming interval based on the prediction. The set of instructions, when executed by one or more processors of the device, may cause the device to request new information associated with the data record from the host during a subsequent interval.

Some implementations described herein relate to a system for scheduling data pulls. The system may include one or more memories and one or more processors communicatively coupled to the one or more memories. The one or more processors may be configured to receive an indication associated with a plurality of pulls for new information, associated with a plurality of data records, that are scheduled periodically. The one or more processors may be configured to receive an indication of a rate limit associated with a host with the data record. The one or more processors may be configured to apply a set of rules to generate a ranking of the plurality of pulls. The one or more processors may be configured to apply a model to generate predictions regarding when new information associated with the plurality of data records will be available at the host. The one or more processors may be configured to schedule the plurality of pulls for new information based on the ranking, the predictions, and the rate limit.

Some implementations described herein relate to a method of scheduling data pulls. The method may include receiving an indication associated with a plurality of data pulls for new information, associated with a plurality of data records, that are scheduled periodically. The method may include receiving an indication of a rate limit associated with a host for the plurality of data records. The method may include applying a set of rules to generate a ranking of the plurality of data pulls. The method may include scheduling the plurality of data pulls for new information based on the ranking and the rate limit.

Some implementations described herein relate to a non-transitory computer-readable medium that stores a set of instructions for scheduling data pulls for a device. The set of instructions, when executed by one or more processors of the device, may cause the device to receive an indication associated with a plurality of data pulls for new information, associated with a plurality of data records, that are scheduled periodically. The set of instructions, when executed by one or more processors of the device, may cause the device to receive an indication of a rate limit associated with a host for the plurality of data records. The set of instructions, when executed by one or more processors of the device, may cause the device to apply a set of rules to generate a ranking of the plurality of data pulls, wherein the ranking includes new pulls at a higher priority than user pulls and includes user pulls at a higher priority than batch pulls. The set of instructions, when executed by one or more processors of the device, may cause the device to schedule the plurality of data pulls for new information based on the ranking and the rate limit.

BRIEF DESCRIPTION OF THE DRAWINGS

FIGS. 2A-2C are diagrams of an example implementation relating to scheduling data pulls.

FIG. 7 is a flowchart of an example process relating to scheduling data pulls.

DETAILED DESCRIPTION

Figure 1A:
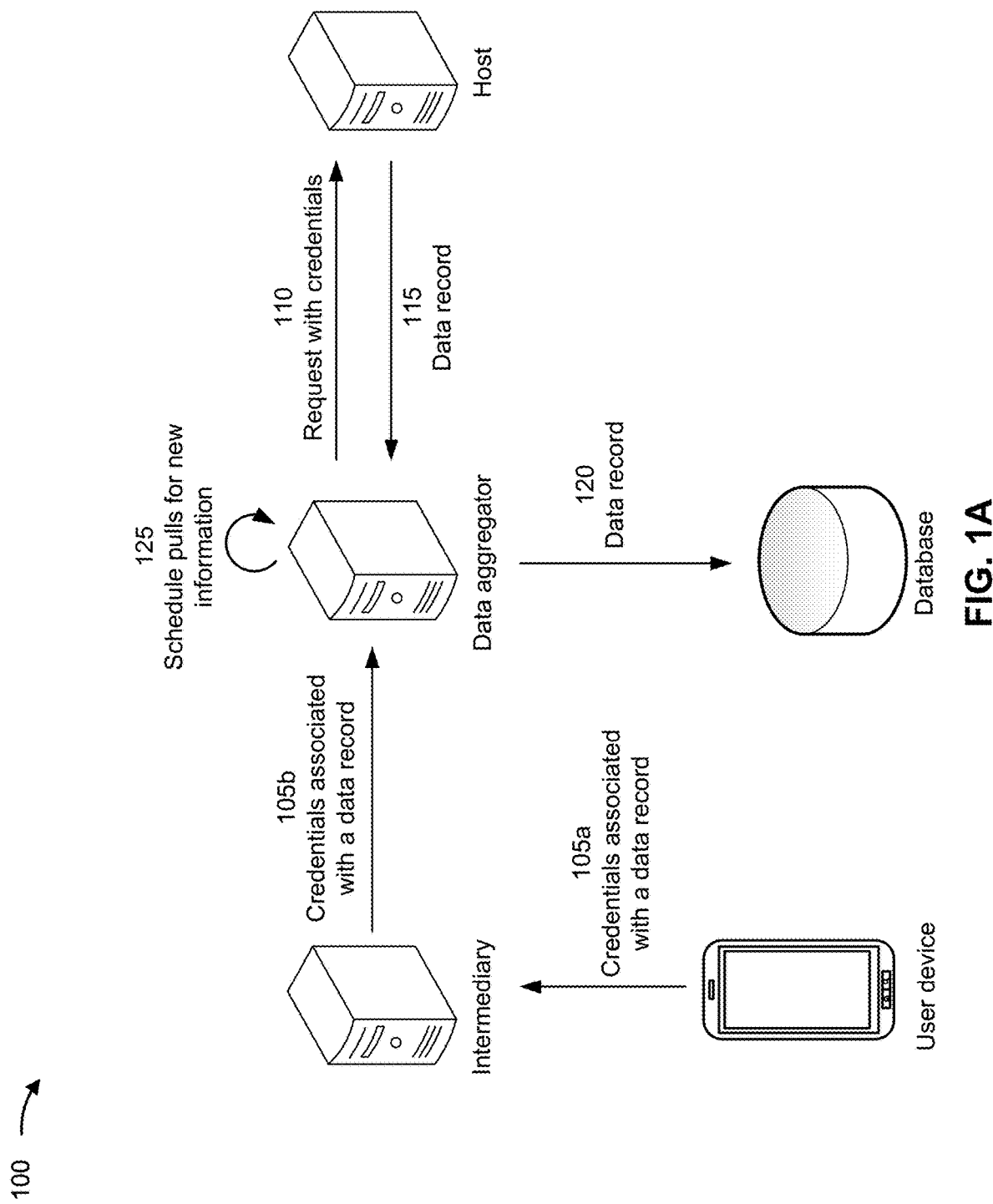
FIGS. 1A-1C are diagrams of an example implementation relating to predicting data availability.

The following detailed description of example implementations refers to the accompanying drawings. The same reference numbers in different drawings may identify the same or similar elements.

Data aggregation may be used to collate multiple data records. A "data record" may include a set of structured data (e.g., a spreadsheet or another type of tabular data structure) or a set of unstructured data (e.g., a comma separated values (CSV) file or another type of text file) associated with a user identifier (e.g., an account number and/or a username). At least two of the data records may be associated with a single data host (e.g., when a user is associated with multiple accounts on the same host). Additionally, or alternatively, at least two of the data records may be associated with different data hosts (e.g., when a user is associated with different accounts corresponding to the hosts). Data aggregation may reduce network resource consumption. For example, a data aggregator may access the data host(s) once in order to collate the records and then distribute the collated records to multiple intermediaries authorized to receive the records. Thus, the data aggregator uses a single data pull to obtain a data record rather than the multiple data pulls that an authorized intermediary would otherwise use.

However, in some situations, the data aggregator may perform a data pull for a data record that is not associated with new information at the data host. For example, the data record may not have been updated since the most recent data pull performed by the data aggregator. Accordingly, the data aggregator wastes processing resources, power, and network resources in performing the data pull. Some implementations described herein provide for a model that predicts if (and, optionally, when) new information will be available, at a host, for a data record. Accordingly, based on output from the model, the data aggregator may refrain from performing a data pull when new information is unlikely to be available, which conserves processing resources, power, and network resources. Further, the model may predict when new information is likely to be available for the data record such that the data aggregator may schedule the data pull for an optimal time, which more efficiently schedules use of processing resources, power, and network resources. As used herein, "optimal time" may be as soon as new data associated with the data record is predicted to be available (e.g., performing a pull at 9:01am because a new event is predicted to be added to the data record at 9:00am), at a future time based on a rate limit, as described below (e.g., performing a pull at 12:00pm because, even though a new event is predicted to be added to the data record at 9:00am, the data host imposes a rate limit), or based on user activity (e.g., performing a pull at 4:30pm because a user tends to request information from an intermediary at 5:00pm).

Some data hosts may impose rate limits on the data aggregator. For example, the data aggregator may use different sets of credentials (e.g., associated with different users) to access different data records on a data host, and the data host may limit a quantity of authentications (where each authentication is associated with one of the sets of credentials) within a time window. In another example, the data aggregator may use an application programming interface (API) call to access each data record on a data host, and the data host may limit a quantity of API calls within a time window. The data aggregator wastes processing resources, power, and network resources whenever the data aggregator attempts a data pull in excess of a rate limit imposed by the host.

Some implementations described herein provide for ranking scheduled data pulls and refraining from executing lower-ranked data pulls in excess of a rate limit. Accordingly, the data aggregator conserves processing resources, power, and network resources. Some implementations may combine the model described above with the ranking. For example, the data aggregator may rank the scheduled data pulls based, at least in part, on the likelihoods output by the model. As a result, additional processing resources, power, and network resources are conserved.

Figure 1B:
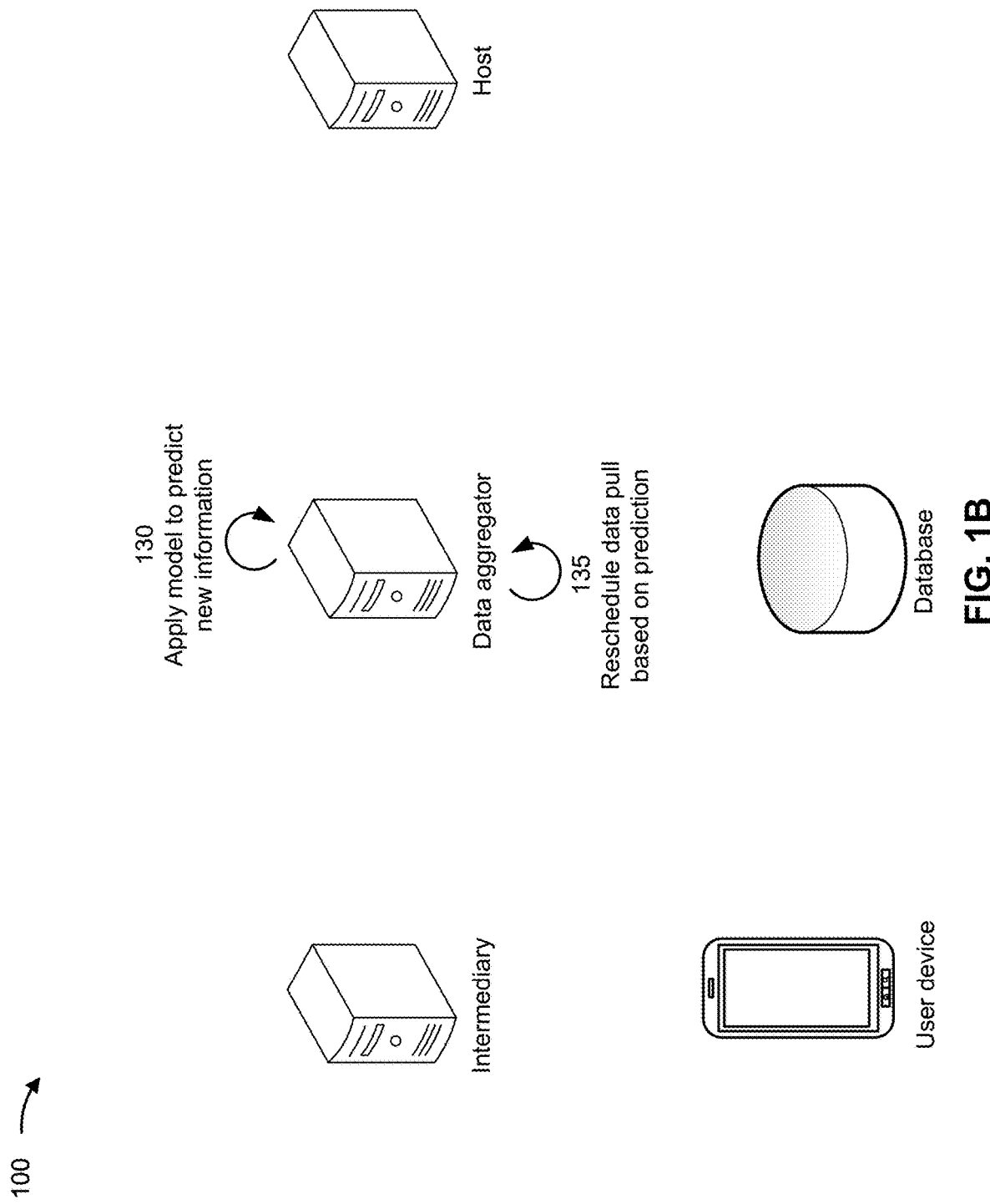
Figure 1C:
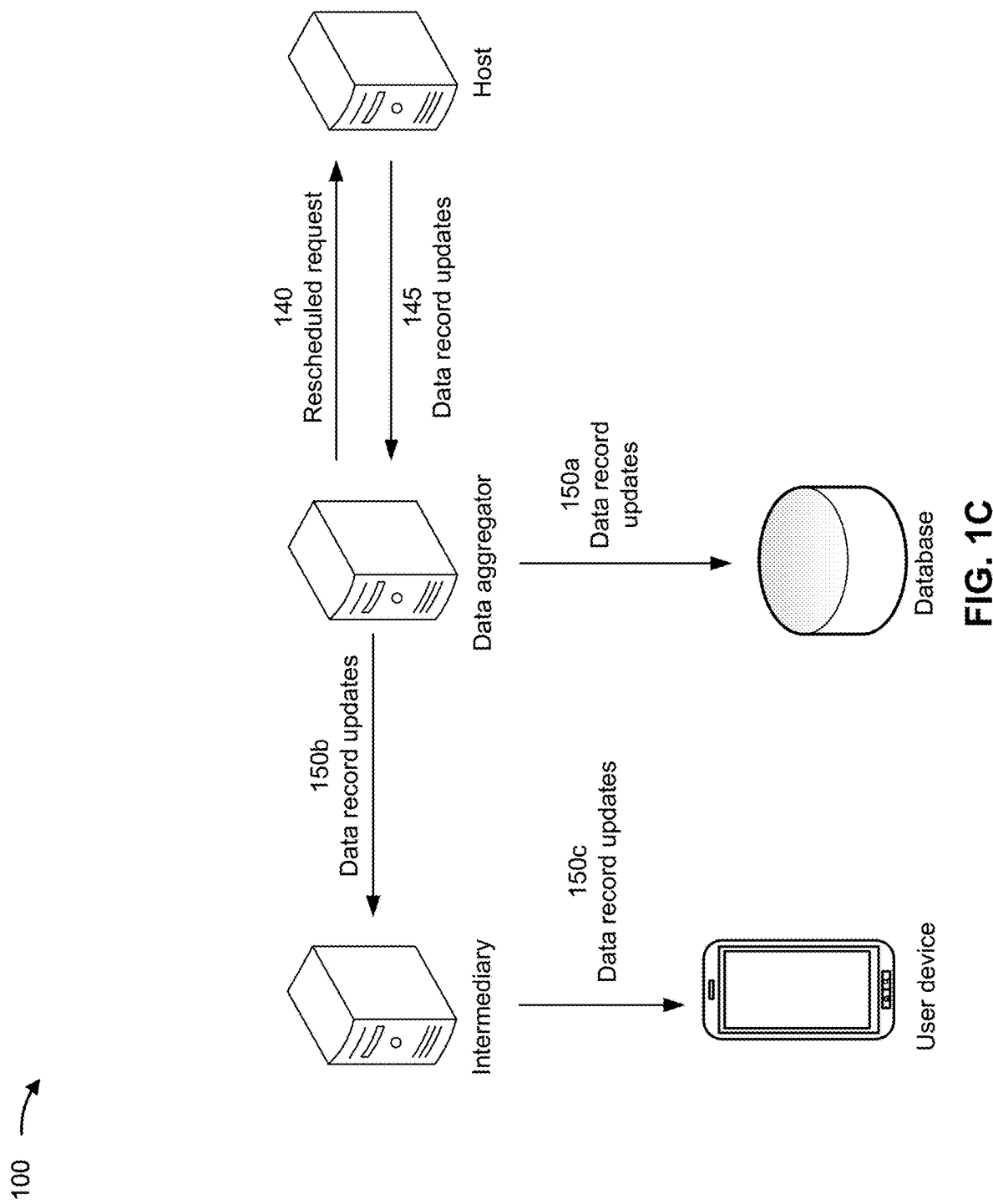

FIGS. 1A-1C are diagrams of an example 100 associated with predicting data availability. As shown in FIGS. 1A-1C, example 100 includes a data aggregator, a user device, a host device, an intermediary, and a device implementing a local database. These devices are described in more detail in connection with FIGS. 4 and 5.

As shown by reference number 105a, the user device may transmit, and the intermediary may receive, credentials (e.g., one or more credentials) associated with a data record maintained by the host device. For example, the credentials may include a username and password, a personal identification number (PIN), biometric information associated with the user, a digital certificate, and/or another piece of authorizing information. The data record may include structured data (e.g., a spreadsheet or another type of tabular data structure) or unstructured data (e.g., a CSV file or another type of text file) associated with an account owned by (or at least accessible to) the user. In some implementations, a user of the user device may register for a service that relies on data aggregation provided by the data aggregator (e.g., by accessing a website associated with the intermediary and/or by performing a call to an API associated with the intermediary, among other examples). Accordingly, the user device may transmit the credentials to the intermediary included in (or after) a registration message.

As shown by reference number 105b, the intermediary may transmit, and the data aggregator may receive, the credentials associated with the data record maintained by the host device. In some implementations, the intermediary may subscribe a data aggregation service provided by the data aggregator (e.g., by accessing a website associated with the data aggregator and/or by performing a call to an API associated with the data aggregator, among other examples). Accordingly, the intermediary may transmit the credentials to the data aggregator in a subscription update message. The intermediary may provide a service to users (e.g., via one or more user devices) such that the intermediary aggregates sets of credentials associated with a corresponding plurality of users and transmits the sets of credentials to the data aggregator. Each set of credentials may therefore be associated with a corresponding data record (or a corresponding plurality of data records) owned by (or at least accessible to) the corresponding user.

Although shown with respect to the intermediary, the data aggregator may alternatively receive the credentials directly from the user device. For example, the user device may be registered for a data aggregation service provided by the data aggregator. Accordingly, the user device may register for the data aggregation service provided by the data aggregator (e.g., by performing a call to an API associated with the data aggregator) and transmit the credentials to the data aggregator included in (or after) a registration message. In another example, the user device may provide the credentials to the data aggregator in order to authorize the intermediary to receive the data records. Accordingly, the data aggregator may generate a separate credential for the intermediary and transmit the separate credential to the intermediary. Accordingly, the intermediary may receive information from the data aggregator using the separate credential.

The data aggregator may perform an initial pull for information associated with the data record. For example, as shown by reference number 110, the data aggregator may transmit, and the host device may receive, a request that includes the credentials. The request may additionally include an indication of the data record (e.g., an account number and/or an account name, among other examples). The request may be transmitted as a parameter for a call to an API associated with the host device. Herein, the initial pull may be referred to as a "new pull" because the data aggregator does not have any information associated with the data record stored in the database.

As shown by reference number 115, the host device may transmit, and the data aggregator may receive, a copy of the data record. For example, the host device may transmit the copy in response to the request from the data aggregator. The copy may be transmitted as a response to the API call performed by the data aggregator. The data aggregator may store the copy of the data record in the database, as shown by reference number 120. The database may be local to the data aggregator. Alternatively, the database may be at least partially separate (e.g., logically, physically, and/or virtually) from the data aggregator. The data aggregator may store the copy of the data record in the database for future transmission to the user device (and/or the intermediary or another device authorized to receive the copy of the data record).

The data aggregator may schedule a pull for new information associated with the data record, as shown by reference number 125. For example, the pull for new information may include a request including credentials associated with the data record. The pull may be scheduled for a "first time" even though the pull is not the initial pull described above. The data aggregator may schedule pulls periodically for the data record. Accordingly, the data aggregator ensures that the copy of the data record in the database remains current. In some implementations, the periodicity is based on a default value. Alternatively, the periodicity may be indicated by the user device (or by the server, as described above). For example, the user device (or the server) may indicate the periodicity in (or after) a registration message described above.

The data aggregator may further receive an indication associated with the data record. The indication may include a data structure encoding an alphanumeric identifier associated with the data record and indicating a type of the data record. For example, the alphanumeric identifier may be an account number, an account name, and/or another type of identifier unique to the data record. The type of the data record may be an account type (e.g., a checking account, a savings account, an auto loan account, or a mortgage account, among other examples). Additionally, or alternatively, the type of the data record may be input-only, output-only, or input-and-output.

The data record may be newly requested, and the indication may be received from the intermediary (e.g., as described in connection with reference number 105*b*). Alternatively, the data record may have a copy stored in the database (e.g., as described in connection with reference number 120), and the indication may be received from a memory associated with the data aggregator (e.g., the memory may be local or may be at least partially separate from the data aggregator and at least partially integrated with the database, whether logically, physically, and/or virtually). As described above, the data record may be associated with an account specific to a corresponding user. Accordingly, the credentials to use for the pull may be associated with the corresponding user and may be received from the user device (or the server), as described above.

As shown in FIG. 1B and by reference number 130, the data aggregator may apply a model to the indication, associated with the data record, to generate a prediction regarding when new information associated with the data record will be available at the host device. The model may be trained on information regarding previous pulls associated with the host device, as described in connection with FIG. 3A. In some implementations, the model may be unique to the data record (e.g., trained on information regarding previous pulls from the host device for the data record). Alternatively, the model may be more general (e.g., trained on information regarding previous pulls from the host device for multiple data records and/or previous pulls from additional host devices).

To apply the model, the data aggregator may input to the model an amount of time since a most recent pull associated with the data record. For example, the model may be trained to predict new information will be available sooner when the most recent pull is further away in time. Additionally, or alternatively, the data aggregator may input to the model a quantity of entries received during the most recent pull. For example, the model may be trained to predict new information will be available sooner when the most recent pull resulted in more new entries associated with the data record. Additionally, or alternatively, the data aggregator may input to the model types of the entries received during the most recent pull. For example, the model may be trained to predict new information will be available sooner when the most recent pull resulted in pending entries as compared with cleared entries and/or in provisional entries as compared with final entries. Additionally, or alternatively, the data aggregator may input to the model a balance associated with the data record. For example, the model may be trained to predict new information will be available sooner when the balance satisfies a balance threshold. Additionally, or alternatively, the data aggregator may input to the model the type of the data record. For example, the model may be trained to predict new information will be available sooner when the data record is a checking record as compared with a savings record or is a credit line record as compared with an installment record. Additionally, or alternatively, the data aggregator may input to the model a rate calculated based on dates and times associated with respective entries in the data record. For example, the model may be trained to predict new information will be available based on a generalized rate at which new entries appear.

Accordingly, the model may be trained on one of more of the following: time since a most recent pull, quantity of pulls per day, transaction metadata (e.g., quantity of entries per day and/or types of entries), account metadata (e.g., quantity of accounts associated with the same user and/or the same data host and types of accounts associated with the same user and/or the same data host), time metadata (e.g., day of a week, hour of a day, holiday schedules, and/or market events), model restrictions (e.g., a floor of how long to wait before a pull and/or a ceiling of how short to wait before a pull), rate limits (e.g., as described herein), a history associated with the intermediary (e.g., a pattern, quantity, and/or datetimes associated with requests from the intermediary), and/or a history associated with data records (e.g., a pattern and/or datetimes associated with new entries in the data records), among other examples.

In some implementations, the data aggregator may store (or at least access) a plurality of models. For example, a first model may be trained on information regarding previous pulls associated with the host device and may output an expected amount of time to wait. Accordingly, the first model may output "1 month," "3 days," "4 hours," or another amount of time. On the other hand, a second model may be trained on information regarding previous pulls associated with the host device and may output an expected datetime. As used herein, "datetime" refers to a data structure that indicates a date or indicates a combination of a date and a time. Accordingly, the second model may indicate "next Tuesday," "August 15th," or another expected datetime. Additionally, in some implementations, the second model may indicate an expected time with the expected date, such as "noon" or "3pm." In order to select between the plurality of models, the data aggregator may use the type of the data record. For example, the data aggregator may select the first model when the data record is a checking record or a credit line record, among other examples, and select the second model when the data record is a savings record or an installment record, among other examples.

Additionally with, or alternatively to, information regarding previous pulls, the models may be trained using hints from a third party, such as a suggestion of a schedule associated with an account from the data host, the intermediary, and/or the user device. Additionally, or alternatively, the models may be trained using information regarding previous pulls performed by the intermediary (e.g., before the intermediary subscribed to the data aggregation service provided by the data aggregator). Additionally, or alternatively, the models may be trained using information provided by the data host (e.g., schedules associated with data record updates in general and/or schedules associated with updates for particular data records). Additionally, or alternatively, the models may be trained using external events, such as a closing of the U.S. stock market, a closing of the Chinese stock market, or ending of a business day or week, among other examples.

As shown by reference number 135, the data aggregator may reschedule the pull, for new information associated with the data record, based on the prediction. When the model outputs an amount of time, the data aggregator may delay the pull for the amount of time. For example, the data aggregator may refrain from requesting new information associated with the data record from the host device, based on the prediction, and schedule a pull for new information associated with the data record for a later time. When the model outputs an expected datetime, the data aggregator may reschedule the pull to be performed on the expected datetime. As a result, the data aggregator conserves power, processing resources, and network resources that would otherwise have been spent transmitting a request to the host device that was likely to result in no new information associated with the data record.

Although described above in connection with the model outputting a prediction of a date (and/or time) new information will be available, the model may alternatively output a probability that new information associated with the data record will be available during a scheduled pull. For example, the model may output a probability between 0.0 and 1.0 that new information will be available. Accordingly, the data aggregator may perform the scheduled data pull when the probability satisfies a probability threshold. On the other hand, the data aggregator may skip the scheduled data pull when the probability fails to satisfy the probability threshold. For example, when data pulls are scheduled periodically, the data aggregator may refrain from requesting new information from the host device during a current (or upcoming) interval and request new information from the host device during a subsequent interval. As a result, the data aggregator conserves power, processing resources, and network resources that would otherwise have been spent transmitting a request to the host device that was likely to result in no new information associated with the data record.

As described above, the prediction from the model may be specific to the data record. On the other hand, the prediction may be associated with all data records at the host device that are associated with a same user. For example, the same user may have multiple accounts, each associated with a corresponding data record at the host device. Accordingly, the data aggregator may perform data pulls for all data records at the host device associated with the same user based on the prediction.

As shown in FIG. 1C and by reference number 140, the data aggregator may transmit, and the host device may receive, a re-scheduled (e.g., according to the prediction) request for new information associated with the data record. The request may include the credentials associated with the data record. The request may additionally include the indication of the data record (e.g., an account number and/or an account name, among other examples). The request may be transmitted as a parameter for a call to an API associated with the host device. Herein, a later pull may be referred to as a "batch pull" because the data aggregator is updating the copy of the data record stored in the database. Alternatively, a later pull may be referred to as a "user pull" when the user device triggers the request for new information (e.g., by transmitting a request to the data aggregator to perform an on-demand data pull).

In some implementations, the data aggregator may re-apply the model to the indication, after skipping the previous data pull and before performing the current data pull, to generate an updated prediction regarding when new information associated with the data record will be available at the host (e.g., an updated amount of time, an updated date and/or time, or an update probability of new information being available). For example, based on the updated prediction, the data aggregator may re-schedule the data pull again or may perform the data pull. Accordingly, the data aggregator may iteratively determine whether to perform a data pull.

As shown by reference number 145, the host device may transmit, and the data aggregator may receive, updates associated with the data record. For example, the host device may transmit a new copy of the data record in response to the request from the data aggregator. Alternatively, the host device may transmit a differential data structure showing changes to the data record since the most recent pull. The updates may be transmitted as a response to the API call performed by the data aggregator. The data aggregator may update the stored copy of the data record in the database, as shown by reference number 150*a*. For example, the data aggregator may update the stored copy of the data record in the database for future transmission to the user device (and/or another device authorized to receive the updated copy of the data record). Alternatively, as shown by reference number 150*b*, the data aggregator may transmit, and the intermediary may receive, the updates to (and/or the updated copy of) the data record. Additionally, as shown by reference number 150c, the intermediary may transmit, and the user device may receive, the updates to (and/or the updated copy of) the data record. For example, the intermediary may push updates to the user device when available, or the intermediary may transmit the updates when the user device accesses (e.g., logs into) the service provided by the intermediary. Although shown with respect to the intermediary, the data aggregator may alternatively transmit the updates to the user device directly, as described above.

In some implementations, the data aggregator may further adjust the periodicity based on output from the model. For example, the data aggregator may increase the period at which data pulls are scheduled when the model predicts longer amounts of time (or predicts a likelihood of new information that fails to satisfy the probability threshold with relative regularity). Similarly, the data aggregator may decrease the period at which data pulls are scheduled when the model predicts shorter amounts of time (or predicts a likelihood of new information that satisfies the probability threshold with relative regularity).

As indicated above, FIGS. 1A-1C are provided as an example. Other examples may differ from what is described with regard to FIGS. 1A-1C.

Figure 2A:
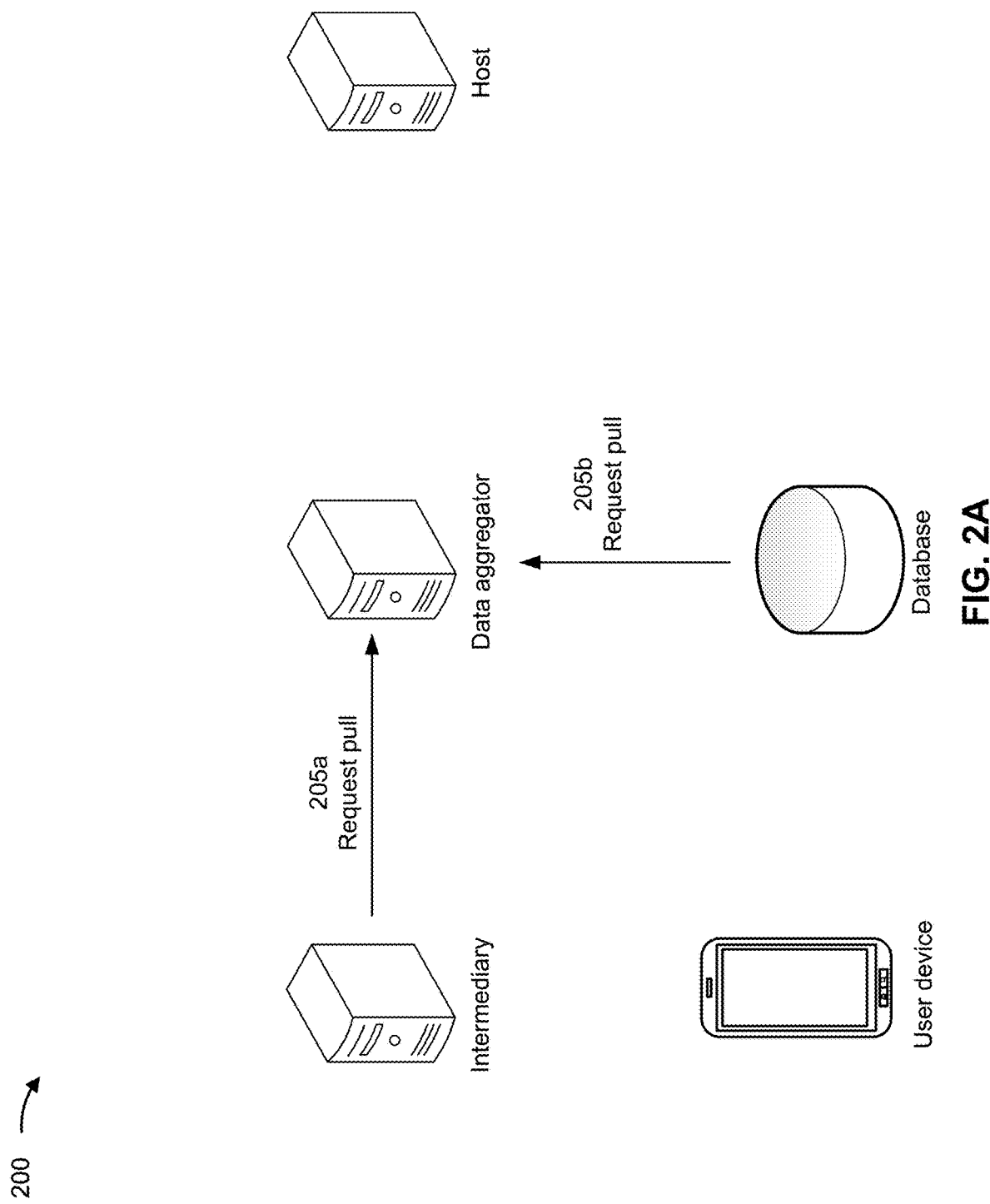
Figure 2C:
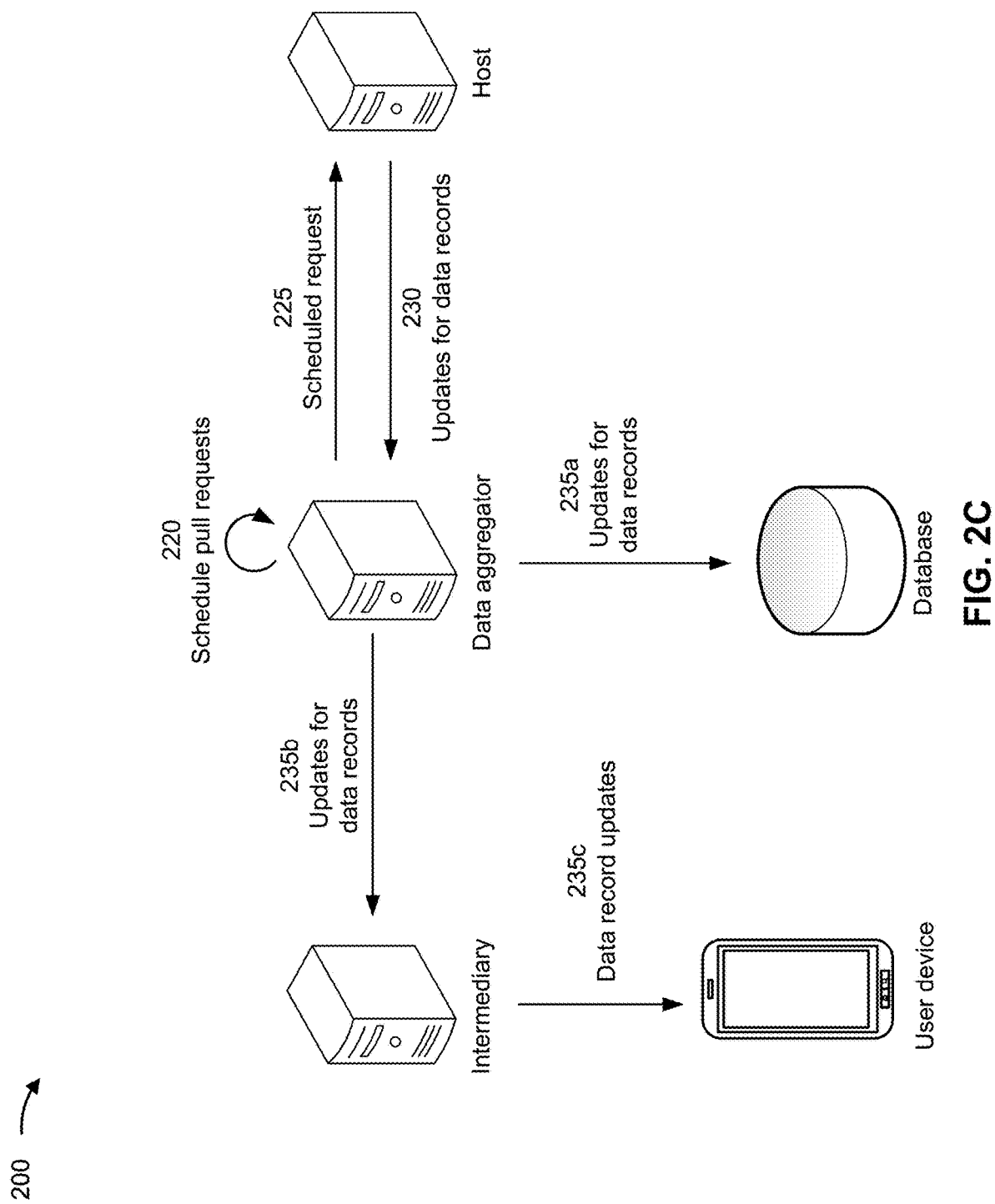

FIGS. 2A-2C are diagrams of an example 200 associated with scheduling data pulls. As shown in FIGS. 2A-2C, example 200 includes a data aggregator, a user device, a host device, an intermediary, and a device implementing a local database. These devices are described in more detail in connection with FIGS. 4 and 5.

As shown in FIG. 2A and by reference number 205a, the user device may transmit, and the data aggregator may receive, a request for a pull for new information associated with a data record. For example, the user device may request the pull for linking the data record to a new application through the data aggregator or may request the pull so that an existing application may have an up-to-date copy of the data record from the data aggregator. Accordingly, the pull may be a new pull or a user pull, as described herein. The data record may be associated with credentials, as described in connection with FIG. 1A. Although described in connection with the user device, new pulls or users pulls may additionally or alternatively be initiated by a server, as described in connection with FIG. 1A.

Additionally, or alternatively, and as shown by reference number 205b, the database may transmit, and the data aggregator may receive, a request for a pull for new information associated with a data record. For example, the database may schedule data pulls periodically in order to keep copies of data records, stored in the database, up-to-date. Accordingly, the pull may be a batch pull, as described herein. The data record may be associated periodic data pulls, as described in connection with FIG. 1A.

The data aggregator may further receive an indication, associated with a plurality of pulls for new information, associated with a plurality of data records. The indication may include a data structure encoding alphanumeric identifiers associated with the data records. For example, the alphanumeric identifiers may be account numbers, account names, and/or other types of identifiers unique to the data records. Each pull may be associated with a corresponding user account, as described in connection with FIG. 1A. The pulls may originate from the intermediary, as described in connection with reference number 205a; from the user device directly; and/or from the database, as described in connection with reference number 205b. Alternatively, the data aggregator may initiate the pulls (e.g., according to a schedule). Accordingly, the pulls may include pulls classified as new pulls, user pulls, and/or batch pulls. Similarly, the pulls may include periodically scheduled pulls (e.g., batch pulls) and/or on-demand pulls (e.g., new pulls and/or user pulls).

As shown in FIG. 2B and by reference number 210, the host device may transmit, and the data aggregator may receive, an indication of a rate limit associated with the host device. The rate limit may include a quantity of authentications within a time window. Additionally, or alternatively, the rate limit may include a quantity of API calls within a time window. The data records, associated with the pulls for new information, may all be associated with the host device. For example, the host device may store the data records. Although shown as received from the data host, the data aggregator may alternatively receive the indication of the rate limit from a memory associated with the data aggregator (e.g., the memory may be local or may be at least partially separate from the data aggregator and at least partially integrated with the database, whether logically, physically, and/or virtually). For example, the host device may have transmitted an indication of the rate limit that the data aggregator stores in the memory for later use.

As shown in FIG. 2B and by reference number 215a, the data aggregator may apply a set of rules to generate a ranking of the plurality of pulls. In some implementations, the set of rules may include a rule that data pulls associated with data records having more recent updates are ranked lower. Accordingly, data pulls that are associated with data records that are more likely to be out-of-date are ranked higher. Additionally, or alternatively, the set of rules may include a rule that data pulls associated with some types of data records are ranked higher than data pulls associated with other types of data records. For example, data pulls that are associated with checking accounts or credit line accounts may be ranked higher than data pulls associated with savings accounts or installment accounts. Additionally, or alternatively, the set of rules may include a rule that data pulls associated with some types of users higher than data pulls associated with other types of users. For example, data pulls that are associated with individual users (e.g., received from user devices) may be ranked higher than data pulls that are associated with institutional users (e.g., received from servers). Additionally, or alternatively, the set of rules may include a rule that new pulls are ranked higher than user pulls and/or that user pulls are ranked higher than batch pulls.

The set of rules may be applied sequentially. For example, the data pulls may be ranked according to an initial rule with ties being broken by one or more additional rules. Additionally, or alternatively, the set of rules may be applied holistically. For example, the data aggregator may generate a score associated with each data pull based on the rules and rank the data pulls according to the associated scores.

In some implementations, as shown by reference number 215b, the data aggregator may additionally apply a model to generate predictions regarding when new information associated with the plurality of data records will be available at the host device. For example, the data aggregator may apply the model as described in connection with FIG. 1B. Accordingly, the set of rules may additionally, or alternatively, include a rule that data pulls, associated with a prediction that is nearer in time (or a likelihood of new information that is greater), are ranked higher than data pulls associated with a prediction that is later in time (or a likelihood of new information that is lesser). Alternatively, the data aggregator may schedule the plurality of pulls based on the predictions without adjusting the ranking based on the predictions, as described in greater detail below.

Therefore, as shown in FIG. 2C and by reference number 220, the data aggregator may schedule the plurality of pulls for new information based on the ranking and the rate limit. In one example, the data aggregator may schedule, for a first interval, the top-ranked data pulls until the rate limit is reached and then label the data pulls that were not scheduled for priority scheduling at a second interval. The intervals may be determined based on the time window associated with the rate limit such that the rate limit will have reset when data pulls are performed during the second interval. The data aggregator may use different scheduling algorithms based on the ranking and the rate limit. For example, the data aggregator may determine a round robin schedule based on groupings of data pulls within the ranking.

In some implementations, the data aggregator may schedule the plurality of pulls for new information based on the ranking and the rate limit in combination with the predictions from the model. For example, the data aggregator may schedule, for a first interval, the top-ranked data pulls, excluding any data pulls associated with predictions that do not satisfy a time threshold (that is, when new information is predicted to be available too far into the future) or a probability threshold (that is, when new information is not sufficiently likely to be available), until the rate limit is reached. Accordingly, excluded data pulls and lower-ranked data pulls may be prioritized for scheduling at a second interval. In another example, the data aggregator may determine a round robin schedule based on groupings of data pulls within the ranking, and then adjust which data pulls are in which groupings based on the predictions. For example, data pulls associated with predictions that do not satisfy a time threshold (that is, when new information is predicted to be available too far into the future) or a probability threshold (that is, when new information is not sufficiently likely to be available) may be swapped with data pulls associated with predictions that do satisfy the time threshold (that is, when new information is predicted to be available soon) or the probability threshold (that is, when new information is sufficiently likely to be available). Accordingly, data pulls associated with predictions that do satisfy the time threshold or the probability threshold are placed in groupings that are scheduled earlier than groupings that include data pulls associated with predictions that do not satisfy the time threshold or the probability threshold.

As described above, the data aggregator may schedule, for a first interval, a portion of the plurality of data pulls, up to the rate limit, according to the ranking and may schedule, for a second interval, a remaining portion of the plurality of data pulls. As shown by reference number 225, the data aggregator may transmit, and the host device may receive, requests for new information based on the scheduled portion of the plurality of data pulls. The requests may include credentials, associated with the data records, for the data pulls. The requests may additionally include indications of the data records (e.g., an account number and/or an account name, among other examples). The requests may be transmitted as parameters for calls to an API associated with the host device.

As shown by reference number 230, the host device may transmit, and the data aggregator may receive, updates associated with the data records. For example, the host device may transmit new copies of the data records in response to the requests from the data aggregator. Alternatively, the host device may transmit differential data structures showing changes to the data records since the most recent pulls. The updates may be transmitted as a response to the API call performed by the data aggregator. The data aggregator may update stored copies of the data records in the database, as shown by reference number 235a. For example, the data aggregator may update the stored copies of the data records in the database for future transmission to the user device (and/or another device authorized to receive the updated copies of the data records). Alternatively, as shown by reference number 235b, the data aggregator may transmit, and the intermediary may receive, the updates to (and/or the updated copies of) the data records. Additionally, as shown by reference number 235c, the intermediary may transmit, and the user device may receive, the updates to (and/or the updated copy of) the data record. For example, the intermediary may push updates to the user device when available, or the intermediary may transmit the updates when the user device accesses (e.g., logs into) the service provided by the intermediary. Although shown with respect to the intermediary, the data aggregator may alternatively transmit the updates to the user device directly, as described above.

As indicated above, FIGS. 2A-2C are provided as an example. Other examples may differ from what is described with regard to FIGS. 2A-2C.

Figure 3A:
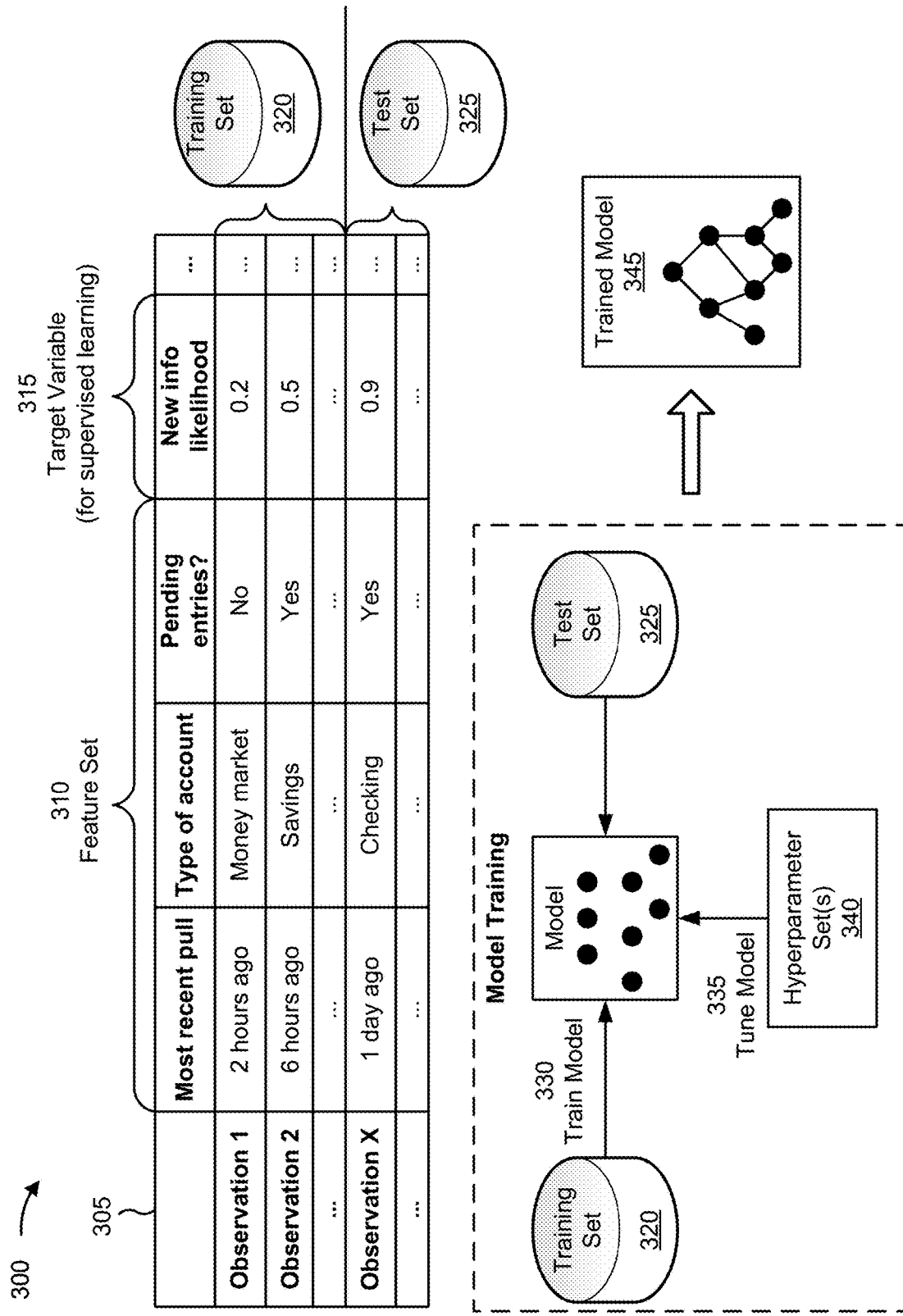
FIGS. 3A-3B are diagrams illustrating an example of training and using a machine learning model in connection with predicting data availability.
Figure 3B:
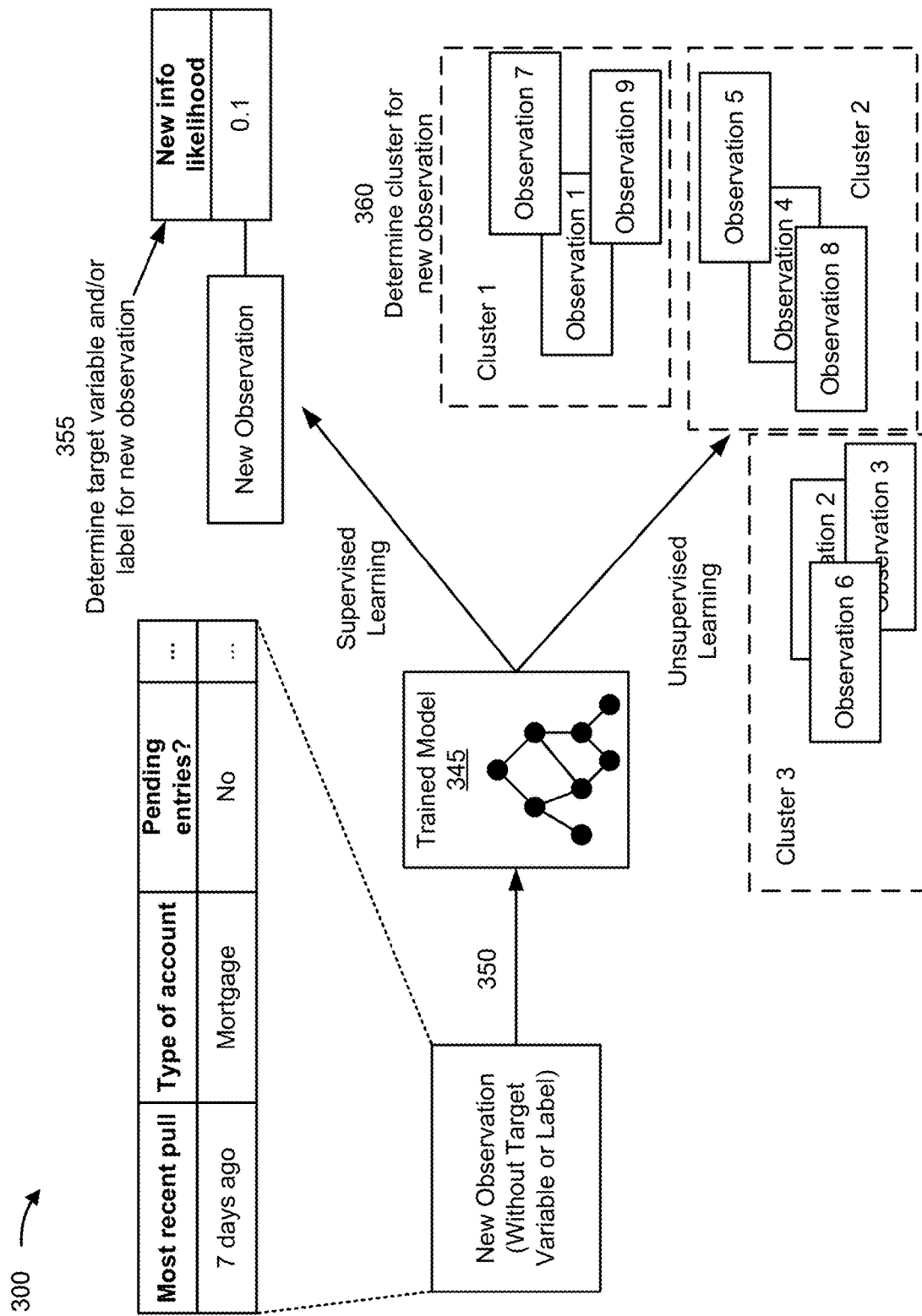

FIGS. 3A-3B are diagrams illustrating an example 300 of training and using a machine learning model in connection with predicting data availability. The machine learning model training described herein may be performed using a machine learning system. The machine learning system may include or may be included in a computing device, a server, a cloud computing environment, or the like, such as a data aggregator described in more detail below.

As shown by reference number 305, a machine learning model may be trained using a set of observations. The set of observations may be obtained and/or input from training data (e.g., historical data), such as data gathered during one or more processes described herein. For example, the set of observations may include data gathered from the data aggregator, as described elsewhere herein. In some implementations, the machine learning system may receive the set of observations (e.g., as input) from the data aggregator.

As shown by reference number 310, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values. In some implementations, the machine learning system may determine variables for a set of observations and/or variable values for a specific observation based on input received from the data aggregator. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Additionally, or alternatively, the machine learning system may receive input from an operator to determine features and/or feature values. In some implementations, the machine learning system may perform natural language processing and/or another feature identification technique to extract features (e.g., variables) and/or feature values (e.g., variable values) from text (e.g., unstructured data) input to the machine learning system, such as by identifying keywords and/or values associated with those keywords from the text.

As an example, a feature set for a set of observations may include a first feature of a most recent data pull for a data record, a second feature of a type of account associated with the data record, a third feature of whether pending entries are present in the data record, and so on. As shown, for a first observation, the first feature may have a value of 2 hours ago, the second feature may have a value of a money market type, the third feature may have a value of no, and so on. These features and feature values are provided as examples, and may differ in other examples. For example, the feature set may include one or more of the following features: a quantity of entries received during the most recent pull, one or more types of the entries received during the most recent pull, a balance associated with the data record, a type of the data record, a rate calculated based on dates and times associated with entries in the data record, or an identifier associated with the host device for the data record. In some implementations, the machine learning system may preprocess and/or perform dimensionality reduction to reduce the feature set and/or combine features of the feature set to a minimum feature set. A machine learning model may be trained on the minimum feature set, thereby conserving resources of the machine learning system (e.g., processing resources and/or memory resources) used to train the machine learning model.

As shown by reference number 315, the set of observations may be associated with a target variable. The target variable may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No), among other examples. A target variable may be associated with a target variable value, and a target variable value may be specific to an observation. In some cases, different observations may be associated with different target variable values. In example 300, the target variable is a likelihood of new information associated with the data record, which has a value of 0.2 for the first observation.

The feature set and target variable described above are provided as examples, and other examples may differ from what is described above. For example, the model may predict a target variable of an estimated amount of time to wait until new information associated with the data record will be available or an expected datetime when new information associated with the data record will be available.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 320 that includes a first subset of observations, of the set of observations, and a test set 325 that includes a second subset of observations of the set of observations. The training set 320 may be used to train (e.g., fit or tune) the machine learning model, while the test set 325 may be used to evaluate a machine learning model that is trained using the training set 320. For example, for supervised learning, the test set 325 may be used for initial model training using the first subset of observations, and the test set 325 may be used to test whether the trained model accurately predicts target variables in the second subset of observations. In some implementations, the machine learning system may partition the set of observations into the training set 320 and the test set 325 by including a first portion or a first percentage of the set of observations in the training set 320 (e.g., 75%, 80%, or 85%, among other examples) and including a second portion or a second percentage of the set of observations in the test set 325 (e.g., 25%, 20%, or 15%, among other examples). In some implementations, the machine learning system may randomly select observations to be included in the training set 320 and/or the test set 325.

As shown by reference number 330, the machine learning system may train a machine learning model using the training set 320. This training may include executing, by the machine learning system, a machine learning algorithm to determine a set of model parameters based on the training set 320. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the training set 320). For example, for a regression algorithm, a model parameter may include a regression coefficient (e.g., a weight). For a decision tree algorithm, a model parameter may include a decision tree split location, as an example.

As shown by reference number 335, the machine learning system may use one or more hyperparameter sets 340 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 320. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model, the machine learning system may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 320. The machine learning system may tune each machine learning algorithm using one or more hyperparameter sets 340 (e.g., based on operator input that identifies hyperparameter sets 340 to be used and/or based on randomly generating hyperparameter values). The machine learning system may train a particular machine learning model using a specific machine learning algorithm and a corresponding hyperparameter set 340. In some implementations, the machine learning system may train multiple machine learning models to generate a set of model parameters for each machine learning model, where each machine learning model corresponds to a different combination of a machine learning algorithm and a hyperparameter set 340 for that machine learning algorithm.

In some implementations, the machine learning system may perform cross-validation when training a machine learning model. Cross validation can be used to obtain a reliable estimate of machine learning model performance using only the training set 320, and without using the test set 325, such as by splitting the training set 320 into a number of groups (e.g., based on operator input that identifies the number of groups and/or based on randomly selecting a number of groups) and using those groups to estimate model performance. For example, using k-fold cross-validation, observations in the training set 320 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k-1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system may perform cross-validation when training a machine learning model by splitting the training set into a number of groups (e.g., based on operator input that identifies the number of groups and/or based on randomly selecting a number of groups). The machine learning system may perform multiple training procedures and may generate a cross-validation score for each training procedure. The machine learning system may generate an overall cross-validation score for each hyperparameter set 340 associated with a particular machine learning algorithm. The machine learning system may compare the overall cross-validation scores for different hyperparameter sets 340 associated with the particular machine learning algorithm, and may select the hyperparameter set 340 with the best (e.g., highest accuracy, lowest error, or closest to a desired threshold) overall cross-validation score for training the machine learning model. The machine learning system may then train the machine learning model using the selected hyperparameter set 340, without cross-validation (e.g., using all of data in the training set 320 without any hold-out groups), to generate a single machine learning model for a particular machine learning algorithm. The machine learning system may then test this machine learning model using the test set 325 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system may store that machine learning model as a trained machine learning model 345 to be used to analyze new observations, as described below in connection with FIG. 4.

In some implementations, the machine learning system may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 320 (e.g., without cross-validation), and may test each machine learning model using the test set 325 to generate a corresponding performance score for each machine learning model. The machine learning model may compare the performance scores for each machine learning model, and may select the machine learning model with the best (e.g., highest accuracy, lowest error, or closest to a desired threshold) performance score as the trained machine learning model 345.

FIG. 3B is a diagram illustrating applying the trained machine learning model 345 to a new observation. As shown by reference number 350, the machine learning system may receive a new observation (or a set of new observations), and may input the new observation to the machine learning model 345. As shown, the new observation may include a first feature of 7 days ago, a second feature of a mortgage type of account, a third feature of no, and so on, as an example. The machine learning system may apply the trained machine learning model 345 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed. Additionally, or alternatively, the output may include information that identifies a cluster to which the new observation belongs and/or information that indicates a degree of similarity between the new observation and one or more prior observations (e.g., which may have previously been new observations input to the machine learning model and/or observations used to train the machine learning model), such as when unsupervised learning is employed.

In some implementations, the trained machine learning model 345 may predict a value of 0.1 for the target variable of a likelihood of new information being available for the new observation, as shown by reference number 355. Based on this prediction (e.g., based on the value having a particular label or classification or based on the value satisfying or failing to satisfy a threshold), the machine learning system may provide a recommendation and/or output for determination of a recommendation, such as refraining from performing a data pull for a data record. Additionally, or alternatively, the machine learning system may perform an automated action and/or may cause an automated action to be performed (e.g., by instructing another device to perform the automated action), such as rescheduling the data pull for the data record. As another example, if the machine learning system were to predict a value of 0.8 for the target variable of a likelihood of new information being available, then the machine learning system may provide a different recommendation (e.g., refraining from rescheduling a data pull for a data record) and/or may perform or cause performance of a different automated action (e.g., performing the data pull for the data record). In some implementations, the recommendation and/or the automated action may be based on the target variable value having a particular label (e.g., classification or categorization) and/or may be based on whether the target variable value satisfies one or more threshold (e.g., whether the target variable value is greater than a threshold, is less than a threshold, is equal to a threshold, or falls within a range of threshold values).

In some implementations, the trained machine learning model 345 may classify (e.g., cluster) the new observation in a cluster, as shown by reference number 360. The observations within a cluster may have a threshold degree of similarity. As an example, if the machine learning system classifies the new observation in a first cluster (e.g., new information likely available), then the machine learning system may provide a first recommendation, such as refraining from rescheduling a data pull for a data record. Additionally, or alternatively, the machine learning system may perform a first automated action and/or may cause a first automated action to be performed (e.g., by instructing another device to perform the automated action) based on classifying the new observation in the first cluster, such as performing the data pull for the data record. As another example, if the machine learning system were to classify the new observation in a second cluster (e.g., new information not likely available), then the machine learning system may provide a second (e.g., different) recommendation (e.g., refraining from performing a data pull for a data record) and/or may perform or cause performance of a second (e.g., different) automated action, such as rescheduling the data pull for the data record.

In this way, the machine learning system may apply a rigorous and automated process to scheduling data pulls for data records. The machine learning system enables recognition and/or identification of tens, hundreds, thousands, or millions of features and/or feature values for tens, hundreds, thousands, or millions of observations, thereby increasing accuracy and consistency and reducing delay associated with scheduling data pulls relative to requiring computing resources to be allocated for data pulls that result in no new information being received.

As indicated above, FIGS. 3A-3B are provided as an example. Other examples may differ from what is described in connection with FIGS. 3A-3B. For example, the machine learning model may be trained using a different process than what is described in connection with FIG. 3A. Additionally, or alternatively, the machine learning model may employ a different machine learning algorithm than what is described in connection with FIGS. 3A-3B, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 4:
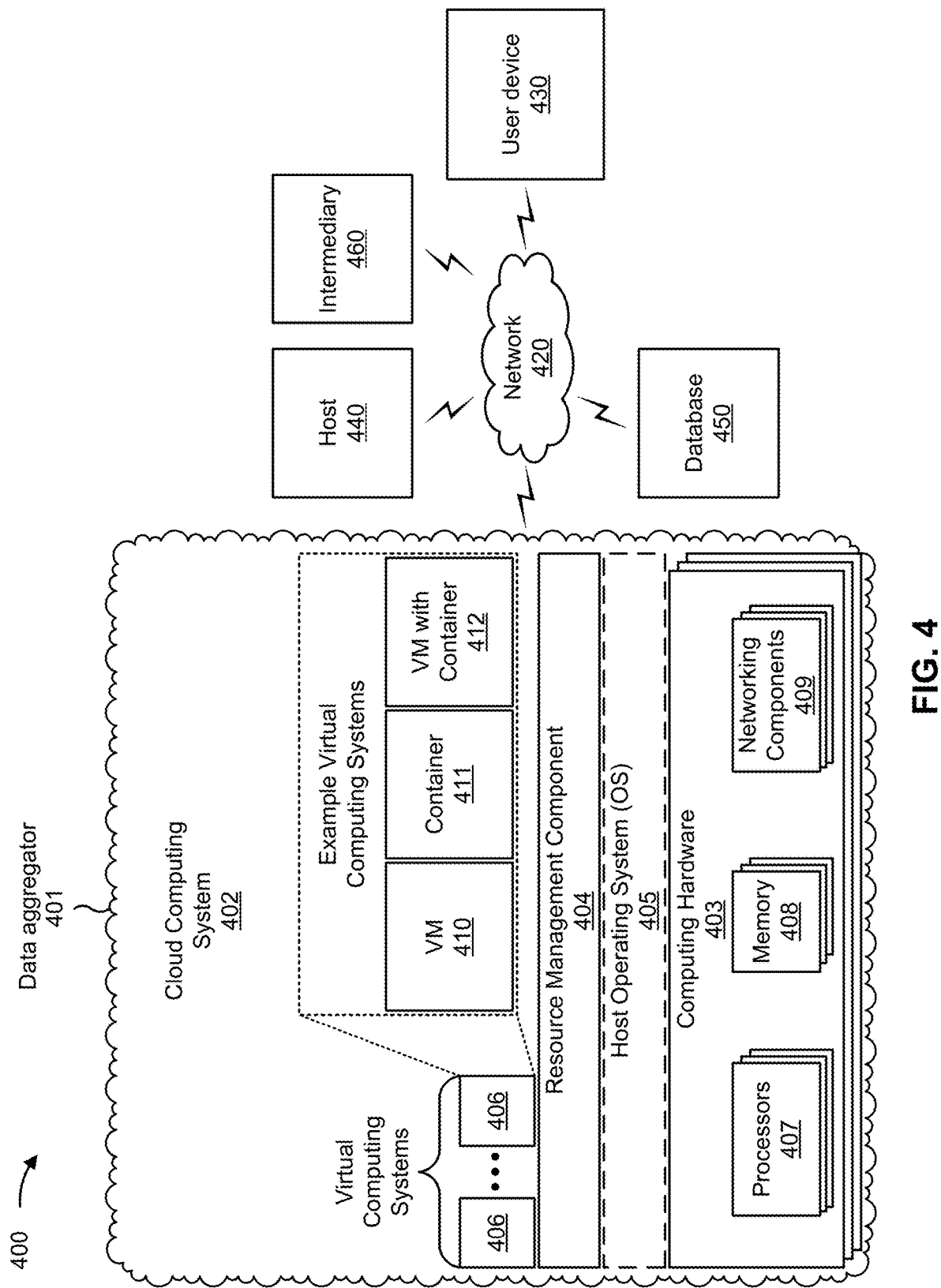
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a data aggregator 401, which may include one or more elements of and/or may execute within a cloud computing system 402. The cloud computing system 402 may include one or more elements 403-412, as described in more detail below. As further shown in FIG. 4, environment 400 may include a network 420, a user device 430, a host device 440, and/or a device implementing a database 450. Devices and/or elements of environment 400 may interconnect via wired connections and/or wireless connections.

The cloud computing system 402 includes computing hardware 403, a resource management component 404, a host operating system (OS) 405, and/or one or more virtual computing systems 406. The cloud computing system 402 may execute on, for example, an Amazon Web Services platform, a Microsoft Azure platform, or a Snowflake platform. The resource management component 404 may perform virtualization (e.g., abstraction) of computing hardware 403 to create the one or more virtual computing systems 406. Using virtualization, the resource management component 404 enables a single computing device (e.g., a computer or a server) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, and/or one or more networking components 409. Examples of a processor, a memory, and a networking component (e.g., a communication component) are described elsewhere herein.

The resource management component 404 includes a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, or another type of hypervisor) or a virtual machine monitor, such as when the virtual computing systems 406 are virtual machines 410. Additionally, or alternatively, the resource management component 404 may include a container manager, such as when the virtual computing systems 406 are containers 411. In some implementations, the resource management component 404 executes within and/or in coordination with a host operating system 405.

A virtual computing system 406 includes a virtual environment that enables cloud-based execution of operations and/or processes described herein using computing hardware 403. As shown, a virtual computing system 406 may include a virtual machine 410, a container 411, or a hybrid environment 412 that includes a virtual machine and a container, among other examples. A virtual computing system 406 may execute one or more applications using a file system that includes binary files, software libraries, and/or other resources required to execute applications on a guest operating system (e.g., within the virtual computing system 406) or the host operating system 405.

Although the data aggregator 401 may include one or more elements 403-412 of the cloud computing system 402, may execute within the cloud computing system 402, and/or may be hosted within the cloud computing system 402, in some implementations, the data aggregator 401 may not be cloud-based (e.g., may be implemented outside of a cloud computing system) or may be partially cloud-based. For example, the data aggregator 401 may include one or more devices that are not part of the cloud computing system 402, such as device 500 of FIG. 5, which may include a standalone server or another type of computing device. The data aggregator 401 may perform one or more operations and/or processes described in more detail elsewhere herein.

Network 420 includes one or more wired and/or wireless networks. For example, network 420 may include a cellular network, a public land mobile network (PLMN), a local area network (LAN), a wide area network (WAN), a private network, the Internet, and/or a combination of these or other types of networks. The network 420 enables communication among the devices of environment 400.

The user device 430 may include one or more devices capable of receiving, generating, storing, processing, and/or providing information associated with data records, as described elsewhere herein. The user device 430 may include a communication device and/or a computing device. For example, the user device 430 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The host device 440 may include one or more devices capable of receiving, generating, storing, processing, and/or providing information associated with data records, as described elsewhere herein. The host device 440 may include a communication device and/or a computing device. For example, the host device 440 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device.

The database 450 may be implemented on one or more devices capable of receiving, generating, storing, processing, and/or providing information associated with data records, as described elsewhere herein. The database 450 may be implemented on communication devices and/or computing devices. For example, the database 450 may be implemented on servers, database servers, application servers, client servers, web servers, host servers, proxy servers, virtual servers (e.g., executing on computing hardware), servers in a cloud computing system, devices that include computing hardware used in a cloud computing environment, or similar types of devices.

The intermediary device 460 may include one or more devices capable of receiving, generating, storing, processing, and/or providing information associated with data records, as described elsewhere herein. The intermediary device 460 may include a communication device and/or a computing device. For example, the intermediary device 460 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
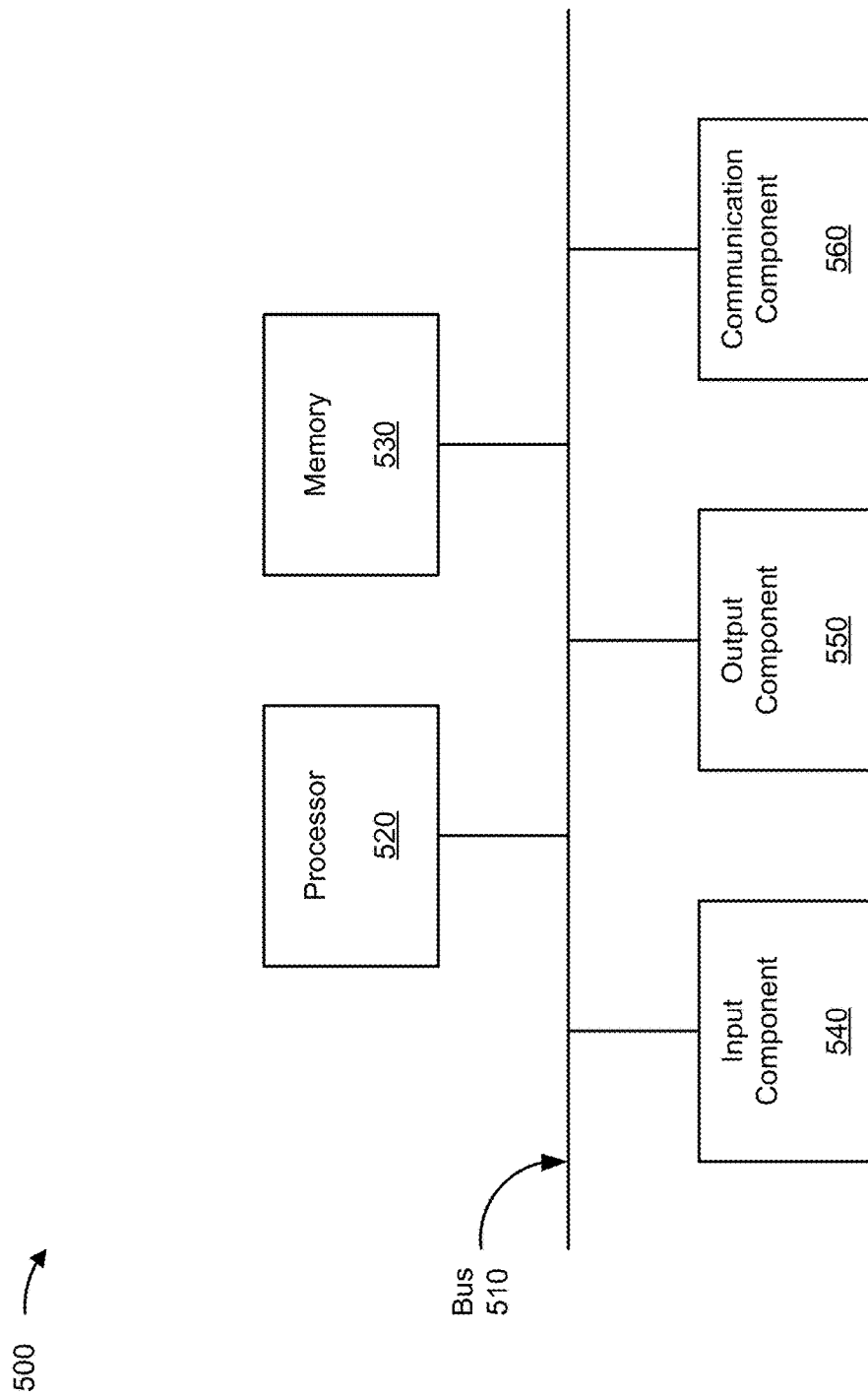
FIG. 5 is a diagram of example components of one or more devices of FIG. 4.

FIG. 5 is a diagram of example components of a device 500 associated with predicting data availability and scheduling data pulls. Device 500 may correspond to a user device 430, a host device 440, a device implementing a database 450, and/or an intermediary device 460. In some implementations, the user device 430, the host device 440, the device implementing the database 450, and/or the intermediary device 460 may include one or more devices 500 and/or one or more components of device 500. As shown in FIG. 5, device 500 may include a bus 510, a processor 520, a memory 530, an input component 540, an output component 550, and a communication component 560.

Bus 510 may include one or more components that enable wired and/or wireless communication among the components of device 500. Bus 510 may couple together two or more components of FIG. 5, such as via operative coupling, communicative coupling, electronic coupling, and/or electric coupling. Processor 520 may include a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 may include one or more processors capable of being programmed to perform one or more operations or processes described elsewhere herein.

Memory 530 may include volatile and/or nonvolatile memory. For example, memory 530 may include random access memory (RAM), read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium. Memory 530 stores information, instructions, and/or software (e.g., one or more software applications) related to the operation of device 500. In some implementations, memory 530 may include one or more memories that are coupled to one or more processors (e.g., processor 520), such as via bus 510.

Input component 540 enables device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 enables device 500 to provide output, such as via a display, a speaker, and/or a light-emitting diode. Communication component 560 enables device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry is used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
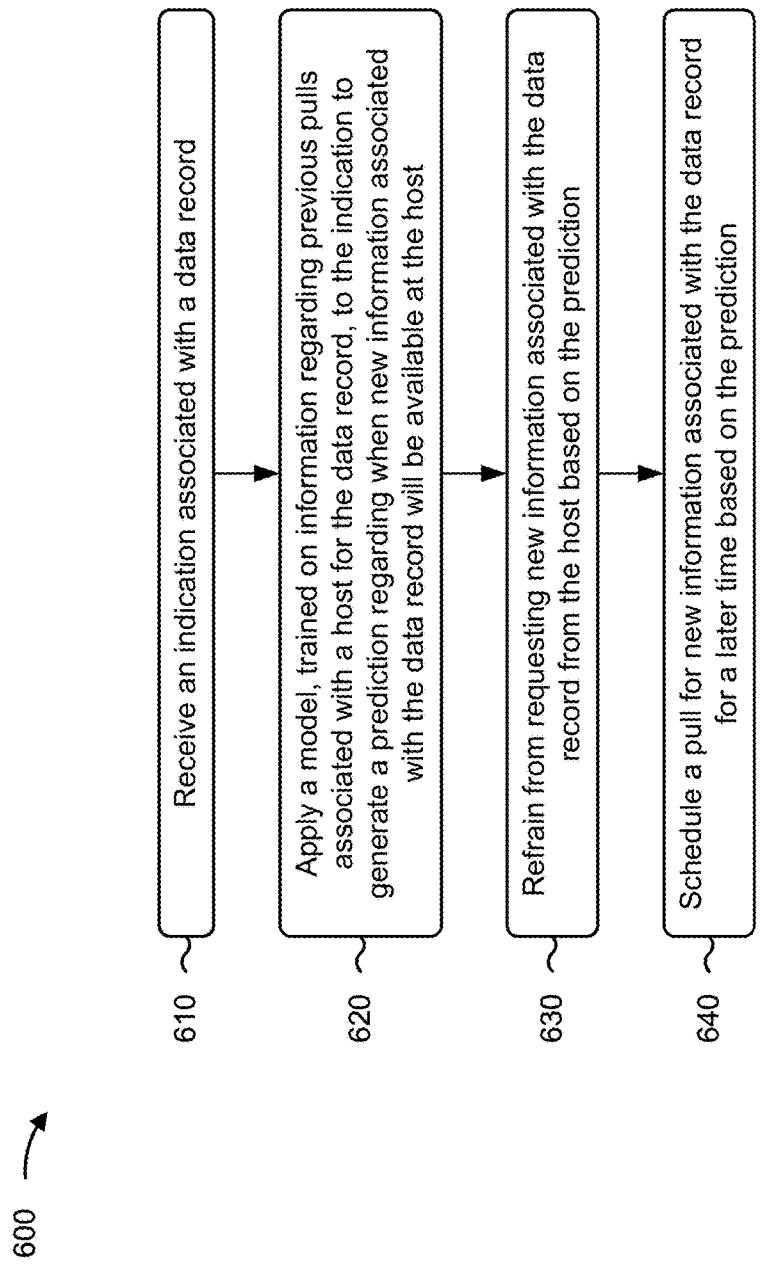
FIG. 6 is a flowchart of an example process relating to predicting data availability.

FIG. 6 is a flowchart of an example process 600 associated with predicting data availability. In some implementations, one or more process blocks of FIG. 6 may be performed by the data aggregator 401. In some implementations, one or more process blocks of FIG. 6 may be performed by another device or a group of devices separate from or including the data aggregator 401, such as a user device 430, a host device 440, a device implementing a database 450, and/or an intermediary device 460. Additionally, or alternatively, one or more process blocks of FIG. 6 may be performed by one or more components of the device 500, such as processor 520, memory 530, input component 540, output component 550, and/or communication component 560.

As shown in FIG. 6, process 600 may include receiving an indication associated with a data record (block 610). For example, the data aggregator 401 (e.g., using processor 520, memory 530, input component 540, and/or communication component 560) may receive an indication associated with a data record, as described above in connection with FIG. 1A.

As further shown in FIG. 6, process 600 may include applying a model, trained on information regarding previous pulls associated with a host for the data record, to the indication to generate a prediction regarding when new information associated with the data record will be available at the host (block 620). For example, the data aggregator 401 (e.g., using processor 520 and/or memory 530) may apply a model, trained on information regarding previous pulls associated with a host for the data record, to the indication to generate a prediction regarding when new information associated with the data record will be available at the host, as described above in connection with reference number 130 of FIG. 1B.

As further shown in FIG. 6, process 600 may include refraining from requesting new information associated with the data record from the host based on the prediction (block 630). For example, the data aggregator 401 (e.g., using processor 520 and/or memory 530) may refrain from requesting new information associated with the data record from the host based on the prediction, as described above in connection with reference number 135 of FIG. 1B.

As further shown in FIG. 6, process 600 may include scheduling a pull for new information associated with the data record for a later time based on the prediction (block 640). For example, the data aggregator 401 (e.g., using processor 520 and/or memory 530) may schedule a pull for new information associated with the data record for a later time based on the prediction, as described above in connection with reference number 135 of FIG. 1B.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1C and/or 2A-2C.

FIG. 7 is a flowchart of an example process 700 associated with scheduling data pulls. In some implementations, one or more process blocks of FIG. 7 may be performed by the data aggregator 401. In some implementations, one or more process blocks of FIG. 7 may be performed by another device or a group of devices separate from or including the data aggregator 401, such as a user device 430, a host device 440, a device implementing a database 450, and/or an intermediary device 460. Additionally, or alternatively, one or more process blocks of FIG. 7 may be performed by one or more components of the device 500, such as processor 520, memory 530, input component 540, output component 550, and/or communication component 560.

As shown in FIG. 7, process 700 may include receiving an indication associated with a plurality of data pulls for new information, associated with a plurality of data records, that are scheduled periodically (block 710). For example, the data aggregator 401 (e.g., using processor 520, memory 530, input component 540, and/or communication component 560) may receive an indication associated with a plurality of data pulls for new information, associated with a plurality of data records, that are scheduled periodically, as described above in connection with

FIG. 2A.

As further shown in FIG. 7, process 700 may include receiving an indication of a rate limit associated with a host for the plurality of data records (block 720). For example, the data aggregator 401 (e.g., using processor 520, memory 530, input component 540, and/or communication component 560) may receive an indication of a rate limit associated with a host for the plurality of data records, as described above in connection with reference number 210 of FIG. 2B.

As further shown in FIG. 7, process 700 may include applying a set of rules to generate a ranking of the plurality of data pulls (block 730). For example, the data aggregator 401 (e.g., using processor 520 and/or memory 530) may apply a set of rules to generate a ranking of the plurality of data pulls, as described above in connection with reference number 215a of FIG. 2B.

As further shown in FIG. 7, process 700 may include scheduling the plurality of data pulls for new information based on the ranking and the rate limit (block 740). For example, the data aggregator 401 (e.g., using processor 520 and/or memory 530) may schedule the plurality of data pulls for new information based on the ranking and the rate limit, as described above in connection with reference number 220 of FIG. 2C.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel. The process 700 is an example of one process that may be performed by one or more devices described herein. These one or more devices may perform one or more other processes based on operations described herein, such as the operations described in connection with FIGS. 1A-1C and/or 2A-2C.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code-it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for predicting data availability, the system comprising:
   one or more memories; and
   one or more processors, coupled to the one or more memories, configured to:
      receive an indication associated with a data record,
         wherein the indication includes a data structure indicating a type corresponding to the data record;
      determine, based at least in part on the type, whether to apply a first model, trained on information regarding one or more pulls associated with a host for the data record, that outputs an expected amount of time until updated information associated with the data record is likely to be available, or a second model, trained on the information regarding the one or more pulls, that outputs an expected datetime corresponding to the updated information;
      apply the first model or the second model to the indication to generate a prediction regarding when the updated information is likely to be available at the host;
      reschedule a request for the updated information to a time specified by the prediction; and
      transmit the request for the updated information at the time specified by the prediction,
         wherein the request for the updated information includes, as parameters for a call to an application programming interface (API) associated with the host, one or more credentials associated with the data record and the indication of the data record.

2. The system of claim 1, wherein the prediction is associated with all data records at the host that are associated with a same user.

3. The system of claim 1, wherein the prediction is specific to the data record.

4. The system of claim 1, wherein the one or more processors are further configured to:
re-apply the first model or the second model to the indication to generate an updated prediction regarding when the updated information is likely to be available at the host; and
request the updated information from the host based at least in part on the updated prediction.

5. The system of claim 1, wherein the one or more processors, to apply the first model or the second model, are configured to:
input, to the first model or the second model, one or more of:
an amount of time since a most recent pull associated with the data record,
a quantity of entries received during the most recent pull,
one or more types of the entries received during the most recent pull,
a balance associated with the data record,
the type of the data record, or
a rate calculated based at least in part on one or more dates and times associated with respective entries in the data record.

6. The system of claim 1, wherein the one or more processors, to reschedule the request, are configured to reschedule a pull for the updated information.

7. The system of claim 1, wherein the data record is associated with an account specific to a user.

8. A method of predicting data availability, comprising:
receiving an indication associated with a data record, wherein the indication includes a data structure encoding a unique identifier associated with the data record;
applying a model, trained on information regarding one or more pulls associated with a host for the data record, to the indication to generate a prediction regarding when updated information associated with the data record will be available at the host;
refraining from requesting the updated information from the host at a first time when the updated information is unlikely to be available according to the prediction; and
transmitting, based at least in part on refraining from requesting the updated information at the first time, a request for the updated information at a second time when the updated information will be available according to the prediction,
wherein the request includes, as parameters for a call to an application programming interface (API) associated with the host, one or more credentials associated with the data record and the indication of the data record.

9. The method of claim 8, further comprising:
re-applying the model to the indication, prior to transmitting the request, to generate an updated prediction regarding when the updated information will be available at the host,
wherein the request is transmitted at the second time based at least in part on the updated prediction.

10. The method of claim 8, wherein a pull for the updated information is scheduled for an earlier time, and transmitting the request for the updated information comprises re-scheduling the pull.

11. The method of claim 8, wherein the model indicates an amount of time, relative to a current time, and the second time is calculated based at least in part on the amount of time.

12. The method of claim 8, wherein the model indicates a date and time when the updated information is likely to be available, and the second time corresponds to the date and time indicated by the model.

13. The method of claim 8, wherein the data structure indicates an account type of the data record.

14. The method of claim 8, wherein the data record is associated with an account specific to a user.

15. A non-transitory computer-readable medium storing a set of instructions for predicting data availability, the set of instructions comprising:
one or more instructions that, when executed by one or more processors of a device, cause the device to:
receive an indication associated with a data record, wherein the indication includes a data structure encoding a unique identifier associated with the data record, and
wherein a pull for updated information associated with the data record is scheduled according to a periodicity;
apply a model, trained on information regarding one or more pulls associated with a host for the data record, to the indication to generate a prediction regarding when the updated information will be available at the host;
refrain from requesting the updated information from the host during an upcoming interval based at least in part on the prediction,
wherein the updated information being unlikely to be available during the upcoming interval based at least in part on the prediction; and
transmit a request for the updated from the host during a subsequent interval based at least in part on the prediction,
wherein the updated information will be available at the subsequent interval based at least in part on the prediction,
wherein the request includes one or more credentials associated with the data record and the indication of the data record, and
wherein the request is a parameter for a call to an application programming interface (API) associated with the host.

16. The non-transitory computer-readable medium of claim 15, wherein the model outputs an indication of a probability that the updated information will be available.

17. The non-transitory computer-readable medium of claim 16, wherein the one or more instructions, that cause the device to refrain from requesting the updated information, cause the device to:
refrain from requesting the updated information based at least in part on the probability failing to satisfy a threshold.

18. The non-transitory computer-readable medium of claim 17, wherein the one or more instructions, when executed by the one or more processors, further cause the device to:
re-apply the model to the indication, after the upcoming interval and before the subsequent interval, to generate an updated probability that the updated information will be available; and wherein the one or more instructions, to transmit the request for the updated information during the subsequent interval, cause the device to:
    transmit the request for the updated information during the subsequent interval based at least in part on the updated probability satisfying the threshold.

19. The non-transitory computer-readable medium of claim 15, wherein the one or more instructions, when executed by the one or more processors, further cause the device to:
    adjust the periodicity based at least in part on one or more outputs from the model.

20. The non-transitory computer-readable medium of claim 15, wherein the data record is associated with an account specific to a user.

* * * * *